US012210369B2

(12) United States Patent
Ritter

(10) Patent No.: US 12,210,369 B2
(45) Date of Patent: Jan. 28, 2025

(54) DEVICE FOR PROVIDING A BANDGAP VOLTAGE REFERENCE

(71) Applicant: Robert Bosch GmbH, Stuttgart (DE)

(72) Inventor: Rudolf Ritter, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 17/911,458

(22) PCT Filed: Jun. 29, 2021

(86) PCT No.: PCT/EP2021/067869
§ 371 (c)(1),
(2) Date: Sep. 14, 2022

(87) PCT Pub. No.: WO2022/002952
PCT Pub. Date: Jan. 6, 2022

(65) Prior Publication Data

US 2023/0096429 A1 Mar. 30, 2023

(30) Foreign Application Priority Data

Jun. 29, 2020 (DE) ..................... 10 2020 208 034.8

(51) Int. Cl.
*G05F 3/00* (2006.01)
*G05F 3/30* (2006.01)

(52) U.S. Cl.
CPC ...................................... *G05F 3/30* (2013.01)

(58) Field of Classification Search
CPC ..................................... G05F 3/30; G05F 3/26
See application file for complete search history.

(56) References Cited

U.S. PATENT DOCUMENTS 11,199,865 B2 * 12/2021 Kang ........................ G05F 3/30
2003/0006747 A1 1/2003 Jaussi et al.
(Continued)

FOREIGN PATENT DOCUMENTS

EP 3644157 A1 4/2020

OTHER PUBLICATIONS

International Search Report for PCT/EP2021/067869, Issued Oct. 12, 2021.

*Primary Examiner* — Jue Zhang
*Assistant Examiner* — Afework S Demisse
(74) *Attorney, Agent, or Firm* — NORTON ROSE FULBRIGHT US LLP; Gerard A. Messina

(57) ABSTRACT

A device for providing a bandgap voltage reference. The device comprises a first switching circuit for providing a first temperature voltage which behaves proportionally to a present temperature, wherein the first switching circuit has two parallel current paths, first and second diode elements being respectively arranged in first and second current paths of the parallel current paths, a second switching circuit for providing a second temperature voltage which behaves in a complementary manner relative to the present temperature, a control circuit which is designed to control a voltage difference between the parallel current paths of the first switching circuit, and a current-bias circuit which is designed to control a ratio of a flow of current through the first diode element to a flow of current through the second diode element, the current-bias circuit comprising a calibration circuit which sets the ratio to a target value.

11 Claims, 1 Drawing Sheet

(56) References Cited

U.S. PATENT DOCUMENTS

| | | | |
|---|---|---|---|
| 2007/0152740 | A1 | 7/2007 | Georgescu et al. |
| 2007/0252573 | A1 | 11/2007 | Tachibana et al. |
| 2018/0149526 | A1 | 5/2018 | Abughazaleh et al. |

* cited by examiner

DEVICE FOR PROVIDING A BANDGAP VOLTAGE REFERENCE

FIELD

The present invention relates to a device for providing a bandgap voltage reference.

BACKGROUND INFORMATION

In a variety of products, a reference voltage with high accuracy is required, which deviates less than 1% from a target value, for example. For example, reference voltages with high accuracy are required for precise voltage or current measurements or for precise temperature measurements. In these cases, the accuracy of the reference voltage must be constant over a service life of the product and also across changing temperatures. In order to achieve this, techniques are used to minimize systematic and statistical errors in circuitry for generating a reference voltage.

One technique for providing a precise reference voltage is circuitry that utilizes a so-called bandgap voltage reference. The technique used in this case is also referred to as "bandgap biasing." A voltage that is proportional to a present temperature is generated. Such a voltage is referred to as PTAT (Proportional to Absolute Temperature) voltage. Furthermore, a further voltage that decreases over a temperature profile is generated. Such a voltage is referred to as CTAT (Complementary to Absolute Temperature) voltage. For example, if the PTAT voltages and the CTAT voltage are added up, the deviations of the respective voltage, which is based on the temperature, are compensated. A largely temperature-dependent reference voltage can thus be provided.

In such circuitry, it is common for a ratio of two currents through two diodes, for example one emitter current each through a bipolar transistor, to be known and to preferably be set to a rational value. This is achieved, for example, by using n+1 similar current sources. For example, a current through a first one of the bipolar transistors is defined by n of the current sources and the current through the other bipolar transistor is defined by a further voltage source in order to achieve a ratio of the currents of n/1.

However, the problem arises that the ratio between these currents deviates from an original target value due to age-related effects or other effects, resulting in a loss of accuracy in the reference voltage. In order to address this problem, the currents of different current sources may be alternately utilized, which is possible based on a dynamic element matching (DEM) method, for example. In this way, deviations between the different current sources may be compensated.

However, the technique based on dynamic element matching entails the problem that the different combinations of the current sources also result in a different ratio between the currents flowing through the two diodes, for example the two bipolar transistors. This may thus result in a deviation in the CTAT voltage and the PTAT voltage. This in turn leads to voltage jumps or peaks, so-called "voltage ripple," in the reference voltage. Thus, such circuitry only allows the reference voltage to be correct on average over time. However, if the reference voltage is used for non-linear signal processing, for example in an ADC, temporary deviations of the reference voltage may result in intermodulation interferences. It is therefore desirable that such deviations in the reference voltage be avoided.

SUMMARY

The present invention relates to a device for providing a bandgap voltage reference. According to an example embodiment of the present invention, the device includes a first switching circuit for providing a first temperature voltage which behaves proportionally to a present temperature, wherein the first switching circuit has two parallel current paths, wherein a first diode element is arranged in a first current path of the parallel current paths and a second diode element is arranged in a second current path of the parallel current paths, a second switching circuit for providing a second temperature voltage which behaves in a complementary manner relative to the present temperature, and a current-bias circuit which is designed to control a ratio of a flow of current through the first diode element to a flow of current through the second diode element, wherein the current-bias circuit comprises a calibration circuit which sets the ratio to a target value.

The first switching circuit is thus a PTAT switching circuit. The first temperature voltage output by the first switching circuit is proportional to a present temperature. This means that at a lower temperature, the first switching circuit outputs a lower voltage as the first temperature voltage than it outputs as the first temperature voltage at a comparatively higher temperature. The abbreviation PTAT stands for "proportional to absolute temperature." A flow of current through the first current path and a flow of current through the second current path is in this case impressed by means of the current-bias circuit. The first diode element is thus connected in parallel to the second diode element. The ratio of the flow of current through the first diode element to the flow of current through the second diode element is predetermined by the current-bias circuit. The first temperature voltage is therefore applied between the output contacts of the two diode elements.

A diode element is a component that has the electrical properties of a diode, in particular a characteristic curve of a diode.

According to an example embodiment of the present invention, the second switching circuit is a CTAT switching circuit. The second switching circuit is designed to provide a second temperature voltage which behaves in a complementary manner relative to the present temperature. The second switching circuit is preferably integrated into the first switching circuit so that it preferably uses common components with the first switching circuit. Further preferably, the second switching circuit comprises an associated diode element through which a predetermined current is conducted. A voltage drop across the diode of the second switching circuit corresponds to the second temperature voltage. In particular, the diode element of the second switching circuit is the second diode element of the first switching circuit. The second temperature voltage is a CTAT voltage, wherein the abbreviation CTAT stands for "complementary to absolute temperature." This means that a voltage value of the second temperature voltage is greater at a low temperature than at a comparatively greater temperature. This means that a voltage value of the second temperature voltage decreases with increasing temperature.

The current-bias circuit is designed to control a ratio of the flow of current through the first diode element to the flow of current through the second diode element. The current-bias circuit thus preferably comprises two inputs, i.e., two ports or input contacts, wherein a first input of the current-bias circuit is connected to the first current path and a second input of the current-bias circuit is connected to the second current path.

According to an example embodiment of the present invention, the current-bias circuit is a circuit which comprises a plurality of resources and, by allocating the resources to the first current path and to the second current path, sets a ratio of the currents flowing through these current paths to one another. For example, X resources are allocated to the first current path and Y resources are allocated to the second current path, for example. In this case, the ratio by way of example results in X:Y.

The current-bias circuit is preferably dynamic, which means that the resources are assigned to the first current path and the second current path in different combinations in successive cycles, wherein the ratio is however maintained. This minimizes an error resulting from the individual elements not being absolutely identical, for example having structural deviations from one another. The current-bias circuit is thus a circuit that, by means of averaging, controls the ratio of the flow of current through the first diode element to the flow of current through the second diode element. The current-bias circuit thus preferably comprises a dynamic element matching circuit, also referred to as a DEM circuit, which allows for the resources to be assigned dynamically.

The current-bias circuit comprises a calibration circuit which sets the ratio to a target value. This is achieved in particular by matching the individual resources of the current-bias circuit to one another, i.e., by setting them to a common calibration value. If the individual resources of the current-bias circuit are matched to one another, the ratio is thus also set to the target value. The ratio is a value resulting from a number of the resources assigned to the first current path in relation to the resources assigned to the second current path.

Preferred developments of the present invention are disclosed herein.

According to an example embodiment of the present invention, the current-bias circuit comprises a number of internal current paths and is designed to respectively provide, in successive cycles, the flow of current through the first diode element of the first switching circuit by a number X of the internal current paths and the flow of current through the second diode element of the first switching circuit by a number Y of the internal current paths, wherein in the successive cycles, different combinations of the internal current paths are respectively assigned to the number X and the number Y, and wherein the ratio of the flow of current corresponds to a value that corresponds to the ratio of the number X to the number Y. Each of the resources of the current-bias circuit is thus preferably an internal current path. In this case, each of the internal current paths is designed to ensure a flow of current of an equal amount, which may however result in structure-related, temperature-related or age-related differences between the flow of current of individual internal current paths. These differences are corrected by means of the calibration circuit.

In order to set the ratio to the target value, a number X of the internal current paths are assigned to the first current path. Simultaneously, a number Y of the internal current paths are assigned to the second current path. Since each of the internal current paths is designed to ensure the same flow of current, a ratio of X:Y results between the current in the first current path and the current in the second current path. This ratio is maintained in each of the successive cycles. However, in each cycle, other ones of the internal current paths are assigned to the number X and to the number Y. This means that the same internal current paths are not always coupled to the first current path or the second current path. This compensates for an error in the average of the targeted ratio of flows of current over time. However, if a discrete time point is considered, the ratio at that time point may be incorrect if no calibration has taken place. The calibration circuit therefore matches the internal current paths to one another, for example by matching a flow of current through the individual current paths to one another, i.e., by adapting them to one another, preferably equating them.

Preferably, the number of the internal current paths of the current-bias circuit is greater than the number X plus the number Y, and the calibration circuit is designed to calibrate, in a cycle, respectively one of the internal current paths to a calibration value that is assigned to neither the number X nor the number Y in this cycle. This means that the calibration circuit is designed to calibrate, in a cycle, at least one internal current path that is coupled to neither the first current path nor the second current path. Since the internal current paths are reselected with each cycle and reassigned to the current paths, it is thus made possible for at least one of the internal current paths to be calibrated in each cycle. No pauses between individual cycles are thus necessary to enable calibration. It is thus made possible to perform the calibration during operation of the device.

The calibration value preferably corresponds to a reference current provided by a reference current source. Each of the internal current paths is designed to ensure that a particular current is conducted through the internal current path. During calibration, this current conducted through the internal current path is set to correspond to the reference current.

Preferably, each of the internal current paths comprises an associated internal current source. During calibration, each of the internal current sources is preferably set to provide a current corresponding to the reference current. The current-bias circuit thus preferably comprises a plurality of current sources, wherein preferably respectively, a number X of the current sources is assigned to the first current path and provides the current through the first diode element, and a number of Y current sources is assigned to the second diode element in order to provide the current through the second diode element. The ratio between the current through the first diode element in relation to the current through the second diode element is thus X:Y, which results from the number of the respectively assigned current sources. Furthermore, in a further internal current path, the current-bias circuit comprises at least one further current source which is calibrated, in particular by matching it with a reference current source while the other current sources provide the current or currents in the ratio X:Y. In each of the cycles, another one of the internal current sources is calibrated. After a particular number of cycles, a repeated calibration of the individual internal current sources occurs. If each of the internal current sources has been calibrated to the reference current, i.e., set to the reference current, the individual internal current sources of the current-bias circuit are identical to one another to the extent that they provide the same current, namely the reference current. Since the assignment of the current sources to the first current path and to the second current path can preferably be fixedly set by a switching matrix, the ratio is thus also set to the desired target value.

When respectively assigning different combinations of the internal current paths to the number X and the number Y in successive cycles, the internal current paths are preferably assigned to the number X or to the number Y according to the rotation principle or the random principle or another sequence.

This means that the internal current paths are in particular assigned to the first current path or to the second current path in a predetermined order or in a random order. In this respect, the rotation principle is advantageous since a defined order is used. This can ensure that each of the internal current paths and thus also each of the preferred internal current sources is calibrated according to a fixedly defined number of cycles. In the case of the random principle, it may be that a period of time until each of the internal current paths has undergone calibration is greater than in the rotation principle. However, by means of the random principle, interference in a particular frequency range is avoided.

According to an example embodiment of the present invention, it is advantageous if the device comprises a control circuit, which is designed to control a voltage difference between the parallel current paths of the first switching circuit, wherein the control circuit preferably regulates the voltage difference to a target value of 0 V. Voltage matching thus takes place between two predefined points in the first current path and in the second current path. This defines at which point the first temperature voltage in one of the current paths can be tapped. When the control circuit regulates the voltage difference to a target value of 0 V, an optimal operating point for the first switching circuit is selected.

According to an example embodiment of the present invention, it is also advantageous if the control circuit comprises a control element and an amplifier, wherein the amplifier is coupled to the first switching circuit in such a way that the voltage difference is applied to the input contacts of the amplifier, and wherein the control element is designed to control, based on an output voltage of the amplifier, an amount of the currents flowing through the current-bias circuit or an output resistor of the current-bias circuit. A parameter that has a direct impact on the voltage present in the first current path and in the second current path is thus set by the amplifier. In this way, a particular operating point for the first switching circuit may be selected and controlled. The control element is preferably formed by a plurality or all of the internal current sources of the current-bias circuit, wherein the internal current sources are controllable current sources.

According to an example embodiment of the present invention, preferably, a resistor is arranged in one of the parallel current paths, in particular in the second current path. This current path furthermore preferably comprises the second switching circuit. The resistor is thus preferably arranged in the second current path, wherein the second diode element simultaneously provides the second temperature voltage, which decreases across the second diode element. Thus, in particular, the first current path comprises only the first diode element and the second current path preferably comprises the second diode element and a resistor connected in series to the second diode element. The voltage difference, which is controlled by the control circuit, is preferably a voltage difference that is applied between the input contacts of the current-bias circuit. The voltage difference that is controlled by the control circuit is also preferably a voltage difference that is applied between an output contact of the first diode element and a contact of the resistor facing away from the second diode element.

According to an example embodiment of the present invention, the first diode element and/or the second diode element is furthermore preferably a diode or a transistor in a diode circuit, wherein in the diode circuit, a diode is simulated by the transistor. The first diode element and/or the second diode element is thus provided in particular by operating an associated transistor in a diode circuit. The transistor is preferably a bipolar transistor.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
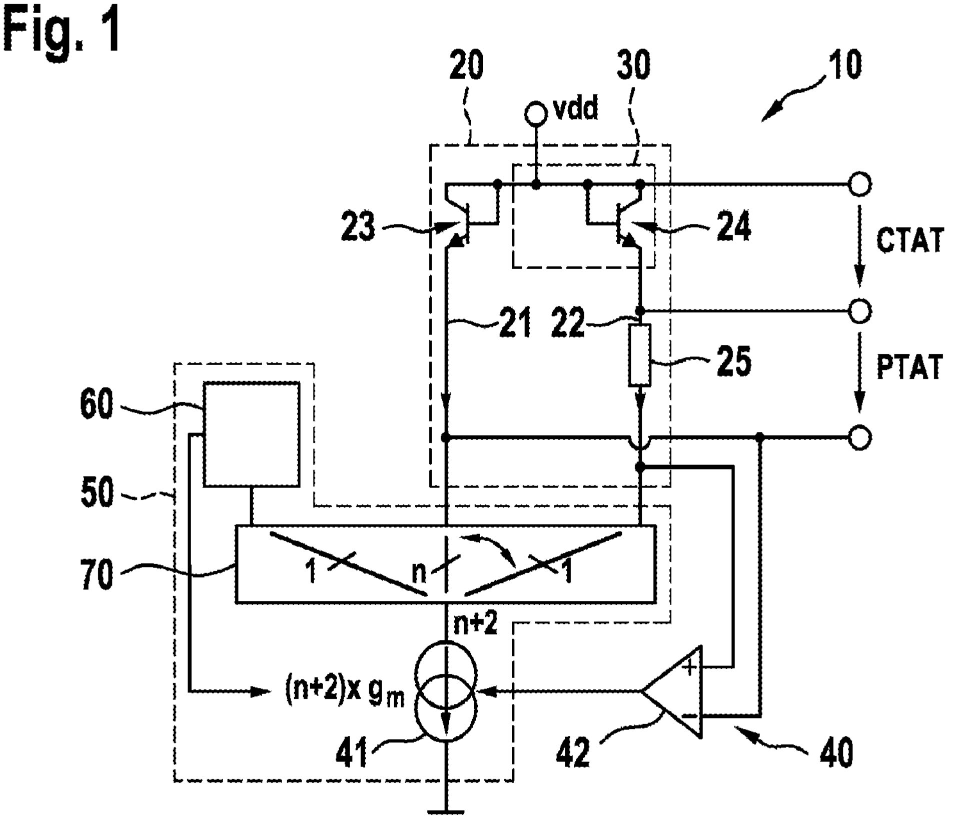
FIG. 1 shows a schematic diagram of a device for providing a bandgap voltage reference according to one example embodiment of the present invention.

FIG. 1 shows a schematic diagram of a device 10 for providing a bandgap voltage reference. In particular, FIG. 1 shows a part of the circuit through which a first temperature voltage PTAT and a second temperature voltage CTAT are provided. The device 10 optionally comprises further components, by which the first temperature voltage PTAT and the second temperature voltage CTAT, which form the voltage reference, are combined to form a reference voltage.

The device 10 comprises a first switching circuit 20, a second switching circuit 30, a control circuit 40 and a current-bias circuit 50.

The first switching circuit 20 is designed to generate and provide the first temperature voltage PTAT. The first temperature voltage PTAT is a voltage which behaves proportionally to a present temperature. This means that with increasing present temperature, the first switching circuit 20 outputs a higher first temperature voltage PTAT.

The first switching circuit 20 comprises two parallel current paths 21, 22. A first diode element 23 is arranged in a first current path 21 of the parallel current paths 21, 22. A second diode element 24 and a resistor 25 are arranged in a second current path 22 of the parallel current paths 21, 22. The first diode element 23 and the second diode element 24 are each provided by a bipolar transistor, which is connected in diode operation. The first diode element 23 and the second diode element 24 are coupled via a respective first side to a supply voltage VDD. Thus, in particular, a base and a collector of the transistors forming the diode elements 23, 24 are respectively coupled to the supply voltage VDD. In the first current path 21, a second side of the first diode element 23, i.e., the emitter of the transistor of the first diode element 23, is coupled to a first input of the current-bias circuit 50. In the second current path 22, a second side of the second diode element 24, i.e., the emitter of the transistor of the second diode element 24, is coupled via the resistor 25 to a second input of the current-bias circuit 50.

In order for the first switching circuit 20 to provide the first temperature position PTAT, it is necessary that a ratio between a current flowing through the first current path 21 in relation to a current flowing through the second current path 22 is known. This is achieved by the current-bias circuit 50, which is designed to control the ratio of flow of current through the first diode element 23 to the flow of current through the second diode element 24. For example, n times the current is conducted through the first current path 21 than is conducted through the second current path 22 and thus through the second diode element 24. The ratio is thus, for example, n:1.

The current-bias circuit 50 comprises a number of internal current paths 51-59. In this case, the current-bias circuit 50 is designed to respectively assign, in successive cycles, a number X of the internal current paths 51-59 to the first current path 21 and a number Y of the internal current paths 51-59 to the second current path 22. Each of the internal current paths 51-59 of the current-bias circuit 50 comprises an internal current source. It is desirable that each of the internal current sources, and thus each of the internal current paths 51-59, provides the same current. However, structural or age-related deviations may occur. A ratio of the number of internal current paths 51-59 assigned to the first current path 21 in relation to the number of internal current paths 51-59 assigned to the second current path 22 results in the ratio of the flow of current through the first diode element 23 to the flow of current through the second diode element 24. Thus, in this embodiment, the number X is equal to the number n and the number Y is equal to 1. The following thus applies: X/Y=n/1.

The current-bias circuit 50 comprises a switching matrix 70, which connects the first current path 21 via X, in particular n, of the internal current paths 51-59 to a circuit ground and connects the second current path 22 via Y, in particular one, of the internal current paths 51-59 to a circuit ground. The internal current sources 41 are arranged on an output side of the switching matrix 70, wherein the number of internal current sources 41 corresponds to the number of internal current paths 51-59 of the current-bias circuit 50.

If the selected ratio is, for example, 7:1, a number of 7 of the internal current paths 51-59 is respectively assigned to the first current path 21 and one of the internal current paths 51-59 is assigned to the second current path 22. Consequently, 7 times the current flows through the first current path 21 and thus through the first diode element 23 than the current flowing through the second current path 22 and through the second diode element 24.

In successive cycles, different combinations of the internal current paths 51-59 are respectively assigned to the number X and the number Y. Thus, X of the internal current sources are respectively assigned to the first current path 21 by the current-bias circuit 50, wherein the same internal current paths 51-59 are not always assigned to the first current path 21. This applies accordingly to the second current path 22, to which the same internal current path of the internal current paths 51-59 is not always assigned. With each cycle, other internal current paths 51-59 are assigned to the first current path 21 or to the second current path 22. In so doing, the internal current paths 51-59 are preferably assigned to the number X or to the number Y, and thus to the first current path 21 or to the second current path 22, according to the rotation principle or the random principle.

Figure 2:
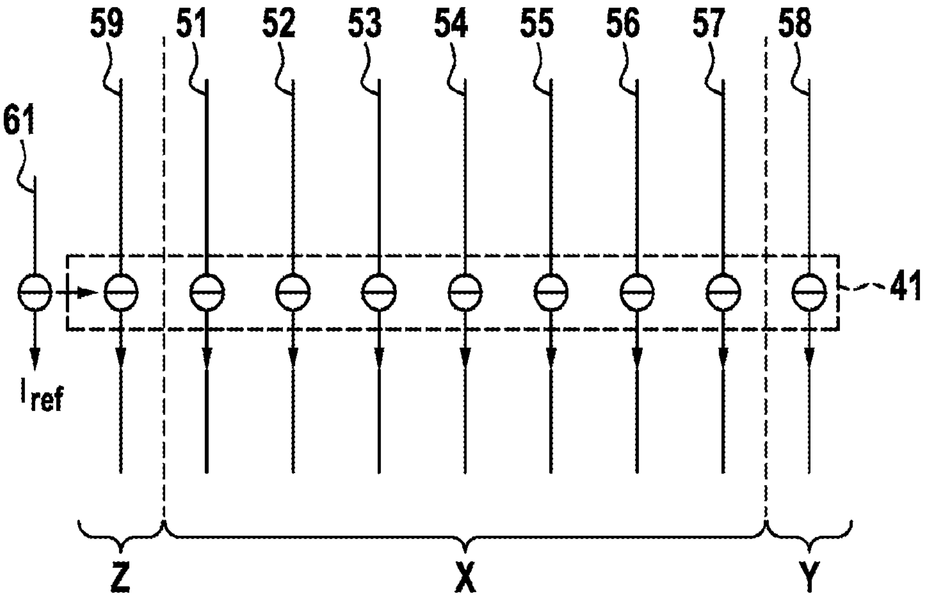
FIG. 2 shows a schematic illustration of a mode of operation of the current-bias circuit, according to an example embodiment of the present invention.

FIG. 2 by way of example shows a number of internal current paths 51-59 of the current-bias circuit 50. Thus, FIG. 2 shows a first current path 51, a second current path 52, a third current path 53, a fourth current path 54, a fifth current path 55, a sixth current path 56, a seventh current path 57, an eighth current path 58, and a ninth current path 59. Each of the current paths 51-59 comprises exactly one internal current source of the internal current sources 41.

FIG. 2 shows an exemplary cycle. The first to seventh internal current paths 51-57 are assigned to the number X, and thus to the first current path 21. Furthermore, the eighth current path 58 is assigned to the number Y, and thus to the second current path 22. The internal current paths associated with the number X are connected in parallel. Thus, in the cycle shown in FIG. 2, seven times the current flows through the first current path 21 than through the second current path 22. In a subsequent cycle, other ones of the internal current paths 51-59 are assigned to the number X. For example, the second to eighth current paths 52-58 are assigned to the number X, and thus to the first current path 21, and the ninth internal current path 59 is assigned to the number Y, and thus to the second current path 22.

However, in the successive cycles, the ratio of the internal current paths assigned to the number X in relation to the number of current paths assigned to the number Y is maintained.

If the current sources in the internal current paths 51-59 were identical in such a way that they would provide exactly the same current, the ratio of X:Y, and thus the ratio of the current through the first current path 21 to the current in the second current path 22, would be exactly 7:1. However, differences may occur between the currents provided by the individual current sources in the internal current paths 51-59 due to aging of the current-bias circuit 50 or due to temperature-related variations. The current-bias circuit 50 therefore comprises a calibration circuit 60 which sets the ratio to a target value. This takes place in that the number of the internal current paths 51-59 of the current-bias circuit 50 is greater than the number X plus the number Y, and the calibration circuit is designed to calibrate, in a cycle, respectively one of the internal current paths 51-59 to a target value, wherein the internal current path to be calibrated is assigned to neither the number X nor the number Y in this cycle. For example, it can be seen in FIG. 2 that in the cycle shown, the ninth internal current path 59 is assigned neither to the number X nor the number Y. The ninth internal current path 59, which comprises an associated internal current source, is calibrated in this cycle. In so doing, the internal current source of the ninth internal current path 59 is set in such a way that the current provided by this current source corresponds to a reference current $I_{ref}$, which is provided by a reference current source 61. In successive cycles, each of the internal current sources of the individual internal current paths 51-59 is set such that the current provided by the respective internal current source corresponds to the reference current $I_{ref}$. It is thus achieved that the same current is provided by each of the internal current paths 51-59. Thus, it is achieved that the ratio of the currents provided by the current-bias circuit 50 for the first current path 21 and for the second current path 22 also corresponds to the ratio between the number of the internal current paths of the current-bias circuit 50 assigned to the parallel current paths 21, 22.

In a corresponding manner, it can be seen in FIG. 1 that in each case, one of the internal current paths 51-59 is coupled to the calibration circuit 60, which provides the reference current $I_{ref}$, n of the internal current paths 51-59 are coupled to the first current path 21, and one of the internal current paths 51-59 is coupled to the second current path 22. The circuit shown in FIG. 1 therefore has n+2 internal current paths, wherein exactly one internal current source of the internal current sources 41 is associated with each of the internal current paths. In so doing, the switching matrix 70 preferably respectively assigns n of the internal current paths 51-59 to the first current path 21, one of the internal current paths 51-59 to the first current path 22, and one of the internal current paths 51-59 to the calibration circuit 60 for calibration.

The control circuit 40 comprises an operational amplifier 42 and a control element 41. The control element 41 in the described embodiment is formed by the internal current sources 43 which are controllable current sources. The operational amplifier 42 is connected via a non-inverting input to the second input of the current-bias circuit 50 and thus also to the second current path 22. An inverting input of the operational amplifier 42 is connected to the first input of the current-bias circuit 50, and thus to the first current path 21. The control circuit 40 controls the internal current sources 43 in the same manner and sets the total current flowing through the current-bias circuit 50. The control circuit 40 does not change the ratio between the flow of current through the first current path 21 in relation to the flow of current in the second current path 22 since this ratio is defined by the numerical ratio of the internal current paths 51-59 assigned to the first current path 21 and to the second current path 22 by the switching matrix 70. Since a different current flows through the first current path 21 and through the second current path 22, the control circuit 40 adjusts a voltage difference between the first current path 21 and the second current path 22 since this voltage difference depends on the total current flowing through the current-bias circuit 50. This voltage difference is regulated to a target value of 0 V. The first switching circuit 20 is thus adjusted to a predetermined operating point at which the former provides the first temperature voltage PTAT.

The second switching circuit 30 for providing the second temperature voltage CTAT is formed by the second diode element 24. The second temperature voltage CTAT behaves in a complementary manner relative to the present temperature. This means that the second temperature voltage CTAT decreases with increasing temperature voltage.

The first temperature voltage PTAT can thus be tapped via the resistor 25 or can be tapped between the first current path 21 and the second current path 22. The second temperature voltage can be tapped via the second diode element 24.

In addition to the above disclosure, reference is explicitly made to the disclosure of FIGS. 1 and 2.

What is claimed is:

1. A device for providing a bandgap voltage reference, comprising:

a first switching circuit configured to provide a first temperature voltage which behaves proportionally to a present temperature, wherein the first switching circuit has two parallel current paths, wherein a first diode element is arranged in a first current path of the parallel current paths, and a second diode element is arranged in a second current path of the parallel current paths;

a second switching circuit configured to provide a second temperature voltage which behaves in a complementary manner relative to the present temperature; and a current-bias circuit configured to control a ratio of a flow of current through the first diode to a flow of current through the second diode, the current-bias circuit including a calibration circuit which sets the ratio to a target value, wherein the current-bias circuit includes a number of internal current paths, and the current-bias circuit is configured to respectively provide, in successive cycles:

a flow of current through the first diode element of the first switching circuit using a number x of the internal current paths; and a flow of current through the second diode element of the first switching circuit using a number y of the internal current paths.

2. The device as recited in claim 1, wherein, in the successive cycles, different combinations of the internal current paths are respectively assigned to the number x and the number y, and wherein the ratio of the flow of current corresponds to a value corresponding to the ratio of the number x in relation to the number y.

3. The device as recited in claim 2, wherein the number of the internal current paths of the current-bias circuit is greater than the number x plus the number y, and the calibration circuit is configured to calibrate, in a cycle, respectively one of the internal current paths to a target value that is assigned to neither the number x nor the number y in the cycle.

4. The device as recited in claim 3, wherein the target value corresponds to a reference current provided by a reference current source.

5. The device as recited in claim 2, wherein each of the internal current paths includes an associated internal current source.

6. The device as recited in claim 2, wherein, when respectively assigning different combinations of the internal current paths to the number x and the number y in successive cycles, the internal current paths are assigned to the number x or the number y according to a rotation principle or a random principle.

7. The device as recited in claim 1, further comprising:

a control circuit configured to control a voltage difference between the parallel current paths of the first switching circuit.

8. The device as recited in claim 7, wherein the control circuit regulates the voltage difference to a target value of 0 V.

9. The device as recited in claim 7, wherein the characterized in that the control circuit includes a control element and an amplifier, wherein the amplifier is coupled to the first switching circuit in such a way that the voltage difference is applied to input contacts of the amplifier, and wherein the control element is configured to control, based on an output voltage of the amplifier, an amount of currents flowing through the current-bias circuit.

10. The device as recited in claim 1, wherein a resistor is arranged in one of the parallel current paths and one of the parallel current paths includes the second switching circuit.

11. The device as recited in claim 1, wherein the first diode element and/or the second diode element is: (i) a diode, or (ii) a transistor in a diode circuit, wherein in the diode circuit, a diode is simulated by a transistor.

* * * * *